United States Patent
Schmidt et al.

(10) Patent No.: US 7,210,243 B2
(45) Date of Patent: May 1, 2007

(54) LEVEL WITH ADJUSTABLE FASTENER LOCATORS

(75) Inventors: William Schmidt, Libertyville, IL (US); Kathleen Fisher, Lindenhurst, IL (US); Jeffrey A. DeBoer, Ann Arbor, MI (US); Michael Nellenbach, Clawson, MI (US)

(73) Assignee: The Faucet Queens, Inc., Vernon Hills, IL (US)

( * ) Notice: Subject to any disclaimer, the term of this patent is extended or adjusted under 35 U.S.C. 154(b) by 52 days.

(21) Appl. No.: 10/992,392

(22) Filed: Nov. 18, 2004

(65) Prior Publication Data
US 2006/0101661 A1    May 18, 2006

(51) Int. Cl.
G01D 21/00 (2006.01)

(52) U.S. Cl. ............................................ 33/613; 33/374
(58) Field of Classification Search ................... 33/613, 33/379, 370, 374
See application file for complete search history.

(56) References Cited

U.S. PATENT DOCUMENTS

| | | | | |
|---|---|---|---|---|
| 2,570,430 A | * | 10/1951 | Cramer | 33/342 |
| 4,394,799 A | * | 7/1983 | Moree et al. | 33/343 |
| 5,103,569 A | * | 4/1992 | Leatherwood | 33/379 |
| 5,103,573 A | * | 4/1992 | Ehling et al. | 33/613 |
| 5,167,075 A | * | 12/1992 | Weldy et al. | 33/343 |
| 5,577,327 A | * | 11/1996 | Archambault | 33/374 |
| 5,806,196 A | * | 9/1998 | Gibbs et al. | 33/333 |
| 6,029,362 A | | 2/2000 | Miodragovic | |
| 6,032,378 A | | 3/2000 | Null | |
| 6,047,478 A | * | 4/2000 | Sowers | 33/379 |
| 6,049,991 A | | 4/2000 | Gruenberg et al. | |
| 6,148,529 A | * | 11/2000 | Kennedy | 33/374 |
| 6,279,240 B1 | * | 8/2001 | Bonaventura, Jr. | 33/374 |
| 6,293,023 B1 | * | 9/2001 | Schooley | 33/374 |
| 6,305,092 B1 | | 10/2001 | Tufariello | |
| 6,305,093 B1 | | 10/2001 | Venola | |
| 6,357,716 B1 | | 3/2002 | Kratish et al. | |
| 6,409,140 B1 | | 6/2002 | Kratish et al. | |
| 6,471,175 B1 | | 10/2002 | Kratish et al. | |
| 6,473,983 B1 | | 11/2002 | Gier | |
| 6,578,812 B2 | | 6/2003 | Lemire | |
| 6,782,628 B2 | * | 8/2004 | Liao | 33/384 |
| 6,785,977 B1 | * | 9/2004 | Crichton | 33/613 |
| 2002/0078583 A1 | * | 6/2002 | Richardson | 33/613 |
| 2003/0005589 A1 | * | 1/2003 | Hale et al. | 33/194 |

* cited by examiner

Primary Examiner—Yaritza Guadalupe-McCall
(74) Attorney, Agent, or Firm—Carlson, Gaskey & Olds

(57) ABSTRACT

A level assembly includes a housing having a level mounted within. The housing includes a first arm and a second arm slidably attached to the housing. The first and second arms are both stored in storage positions. Fastener locators associated with each arm are both stored in storage positions. During use the fastener locators are pivoted to an extended position. If additional distance between the fastener locators is needed the first and second arms can also be extended by sliding them along another axis relative to the housing.

10 Claims, 5 Drawing Sheets

LEVEL WITH ADJUSTABLE FASTENER LOCATORS

BACKGROUND OF THE INVENTION

The present invention is a level and more particularly a level having slidable arms with adjustable fastener locators for simultaneously designating a multiple of fastener locations.

In order to hang an object on a wall, all of the locations for the fasteners that mount the object must be precisely marked. Various devices that assist in marking the fastener positions are known. Conventional devices include levels that have indicators for marking the distance between the fasteners. However, simultaneously marking a multiple fastener locations in a level position and at a desired separation distance may be relatively difficult utilizing conventional level devices.

Conventional level devices that mark multiple locations at one time may be relatively large and awkward devices. These conventional level devices may be difficult and inconvenient to store and use for most common household tasks.

Thus, a compact device that assists in hanging and leveling objects that use multiple fasteners is needed.

SUMMARY OF THE INVENTION

The present invention provides a level assembly including a housing having a level mounted within. A first arm and a second arm interface with the housing along a first axis. The first arm and the second arm are slidably attached to the housing to move along the first axis relative to the housing. Each arm has a fastener locator that is aligned with a corresponding fastener on the picture or object. The fastener locators are then used to locate the appropriate position for the fasteners on the wall.

The fastener locators are mounted to the arms to pivot about a second axis between a storage position and an extended position. The fastener locators each have an aperture to guide a marking device to pass through for marking a fastener location when hanging an object.

In use, the fastener locators are pivoted to an extended position. Each arm has a groove in which the fastener locators are slidably retained. The groove is located along a second axis such that the fastener locators slide along the second axis. Each fastener locator is slidable along the second axis until the desired spacing between the fastener locators is obtained. To mark relatively greater distances between fasteners the first and second arms are be extended by sliding them along the first axis relative to the housing. For storage the arms are retracted and the fastener locators are returned to the storage positions.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
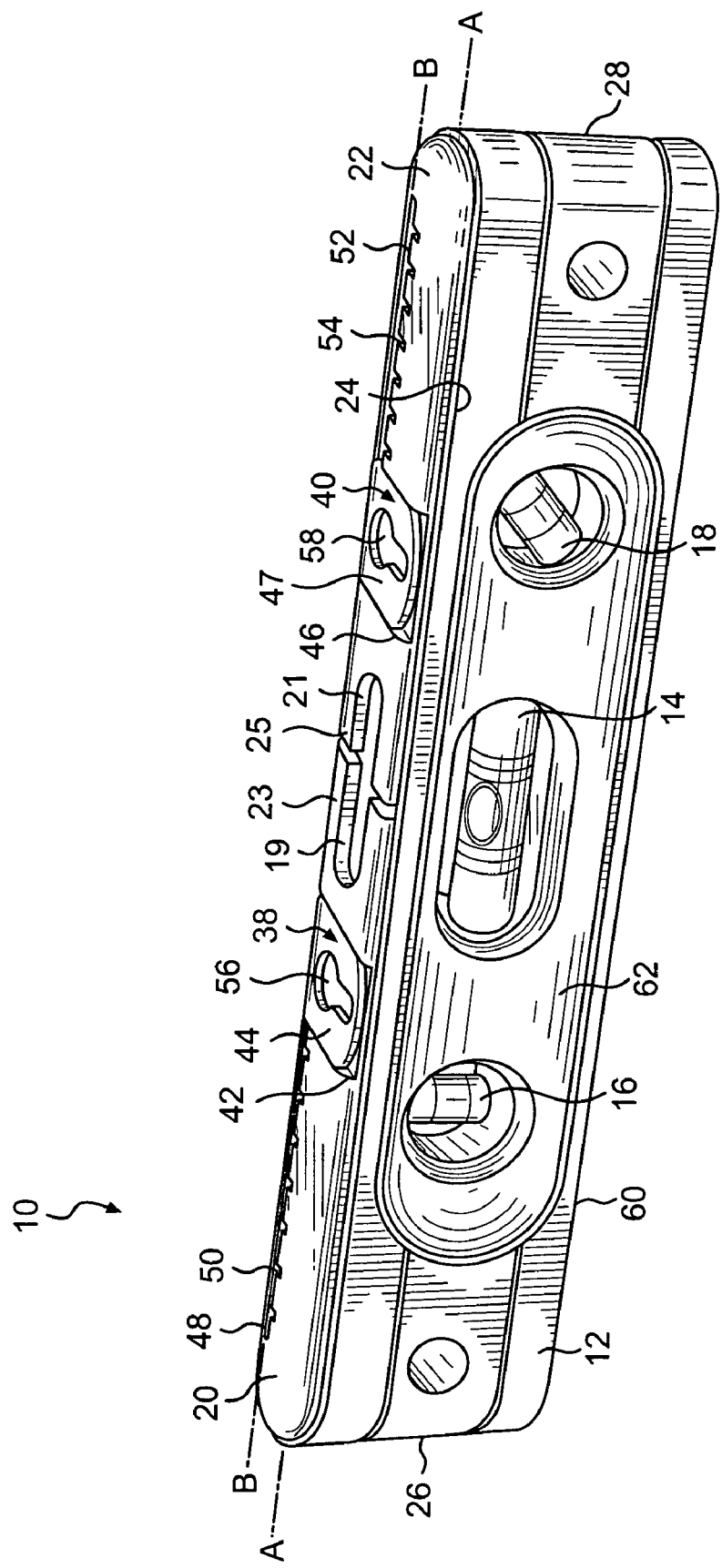
FIG. 1 is a general view of the leveling device of the present invention.

FIG. 1 illustrates a level assembly 10 which includes a housing 12 that defines a first axis A. Mounted within the housing 12 is a level 14. The level 14 is a parallel to the first axis A. Additional levels 16 and 18 may correspond to other axes such as an axis perpendicular to the first axis A.

The level assembly includes a first arm 20 and a second arm 22. The first arm is located on a top side 24, adjacent a first end 26 of the level assembly 10. The second arm 22 is also located on the top side 24 of the level assembly 10. The second arm 22 is located adjacent a second end 28. When in a retracted position the first arm 20 preferably does not extend beyond the first end 26. Likewise, when in a retracted position the second arm 22 does not extend beyond the second end 28.

The first arm 20 and the second arm 22 interface with the housing 12 along the first axis A. The first arm 20 is attached to the housing 12 such that the first arm 20 is moveable relative to the housing 12 along the first axis A.

Figure 2:
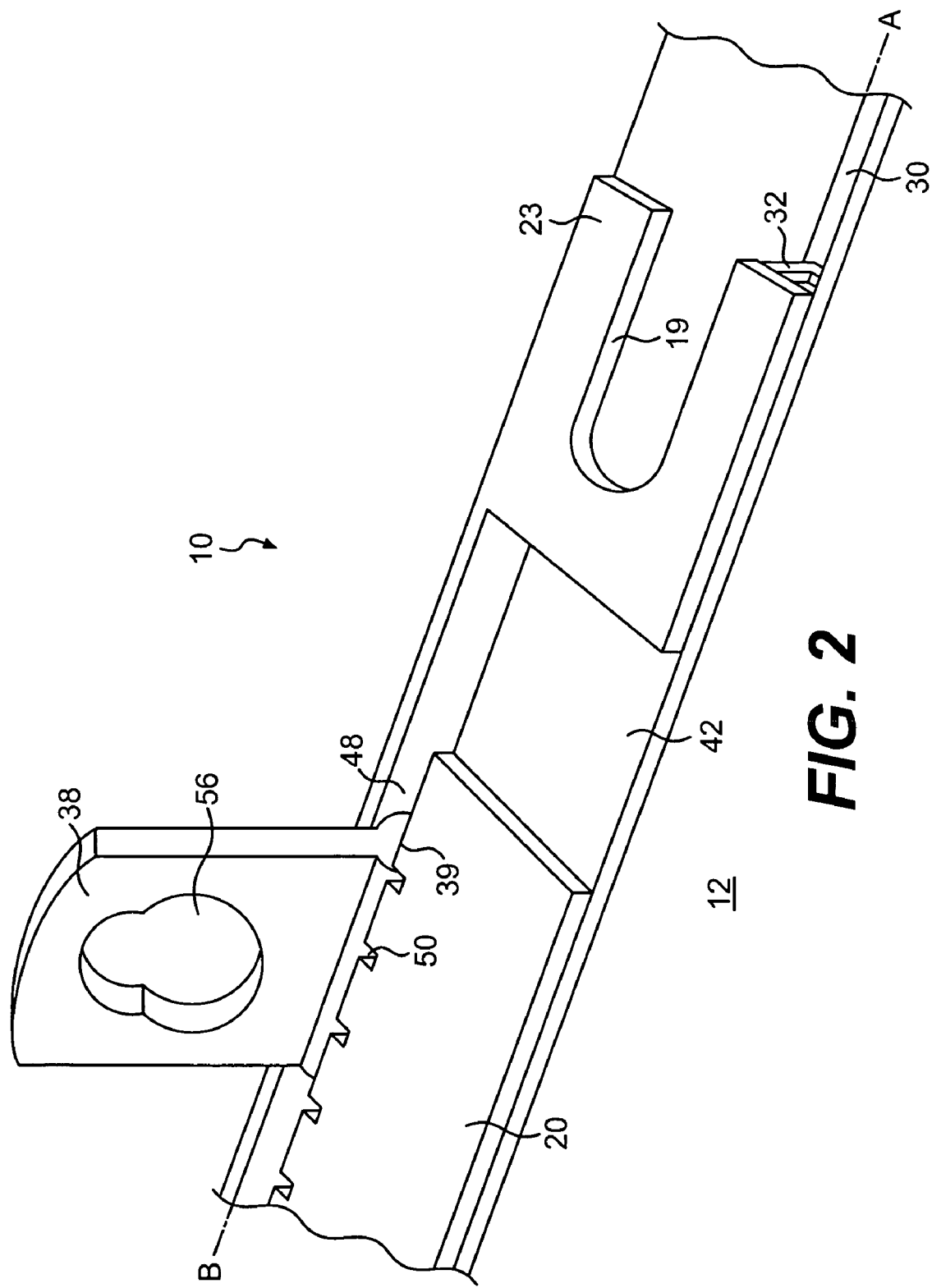
FIG. 2 is a perspective view of one embodiment showing the interface between the first arm and the housing of the leveling device.

FIG. 2 shows one embodiment of the first arm 20 where the interface is a groove 30 formed in the housing 12. The groove 30 defines the first axis A. A first tongue 32 extends from the first arm 20. The first tongue 32 fits within the groove 30 such that the first tongue 32 can slide within the groove 30. Applying force to the first arm 20 causes the first tongue 32 to slide within the groove 30 and the first arm 20 to move relative to the housing 12. An indentation 19 adjacent to a center section 23 of the first arm 20 allows for axial force to be applied to the first arm 20 along the first axis A. The second arm 22 is attached in a similar manner such that it is movable along the first axis A relative to the housing 12.

Figure 5:
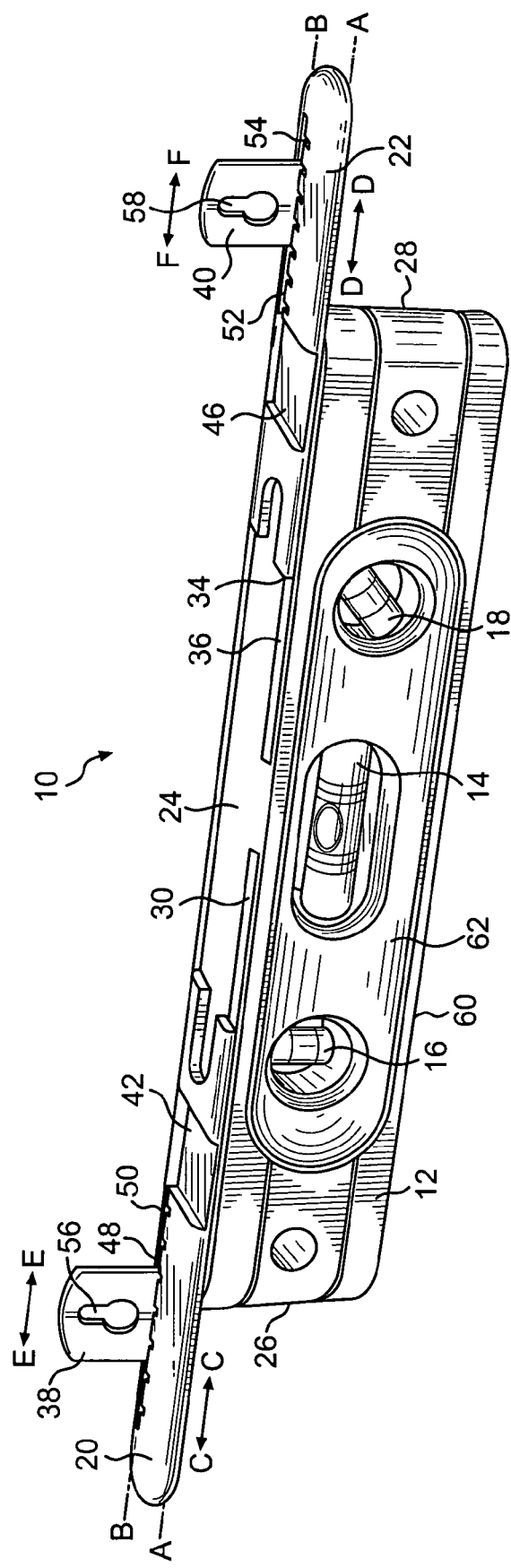
FIG. 5 is a general view of one embodiment of the leveling device where the arms and fastener locators are in extended positions.

The second arm 22 includes a second tongue 34 similar to the first tongue 32. The second tongue 34 corresponds to groove 36 in the housing 12. An indentation 21 adjacent to a center section 25 of the second arm 22 allows for axial force to be applied to the second arm 22 along the first axis A. Additionally, the indentations 19 and 21 allow the level 14 to be seen from the top of the housing 12. Other types of interfaces that permit the first arm 20 and the second arm 22 to move relative to the housing 12 may additionally or alternatively be used. In this embodiment, the first arm 20 and the second arm 22 slide between a storage position and an extended position (FIG. 5).

The first arm 20 includes a first fastener locator 38. The second arm 22 includes a second fastener locator 40. The first fastener locator 38 and second fastener locator 40 are movable between storage positions (FIG. 1) and extended positions (FIG. 5). The first fastener locator 38 fits within a first recess 42 defined in the first arm 20 such that a first side 44 of the first fastener locator 38 is relatively level with the first arm 20. When in the storage position the second fastener locator 40 fits within a second recess 46 defined in the second arm 22 such that a first side 47 of the second fastener locator 40 is relatively with the second arm 22. The first recess is formed by a separation between the first arm 20 and the center section 23. Likewise the second recess 46 is formed by a separation between the second arm 22 and the second center section 25.

The first arm 20 has a first groove 48 in which the first fastener locator 38 is slideably retained. The first groove 48 defines the second axis B along which the first fastener locator 38 is slidable. The second axis B is parallel to the first axis A. The first fastener locator 38 has an engagement member 39 that corresponds to the groove 48. The engagement member 39 has a cylindrical shape such that the first fastener locator 38 is slidably and rotatably retained within the groove 48. The cylindrical shape of the engagement member 39 permits the first fastener locator 38 to pivot about a second axis B between the storage and extended position and to slide within the groove 48. The groove 48 has a first set of indentations 50 for marking preset distance locations of the first fastener locator 38. It should be understood that other indicia may be utilized.

The second arm 22 has a second groove 52 in which the second fastener locator 40 is slidably retained in a similar manner. The second groove 52 has a second set of indentions 54 marking preset distance locations of the second fastener locator 40. The second groove 52 is parallel with the first groove 48 such that the second fastener locator 40 is slidable along the second axis B.

Figure 3:
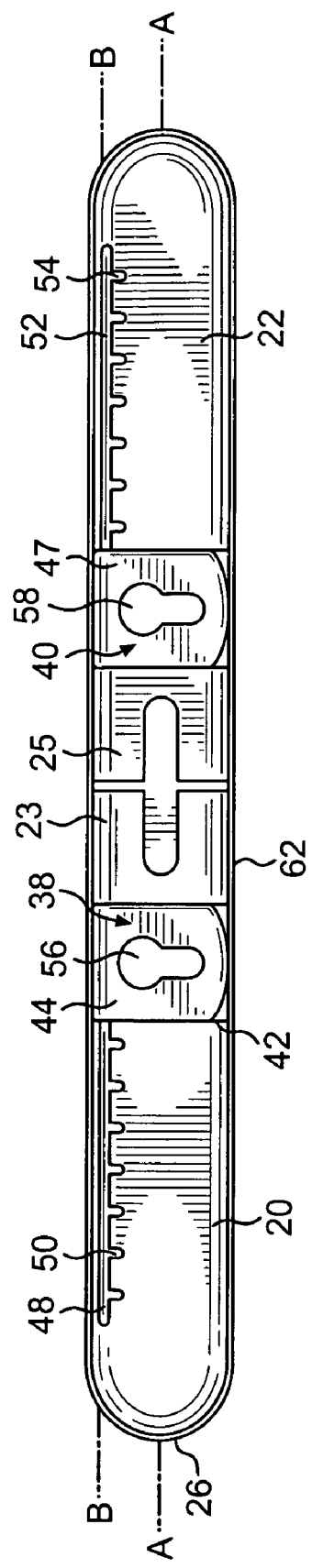
FIG. 3 is a view of the top side of the leveling device of the present invention.

FIG. 3 illustrates a top view of the level assembly 10 in a storage position. The first fastener locator 38 defines a first aperture 56 and the second fastener locator 40 defines a second aperture 58. In this embodiment both apertures have a keyhole shape. The first aperture 56 and second aperture 58 allow a marking device to pass through for marking a fastener location when hanging an object.

Figure 4:
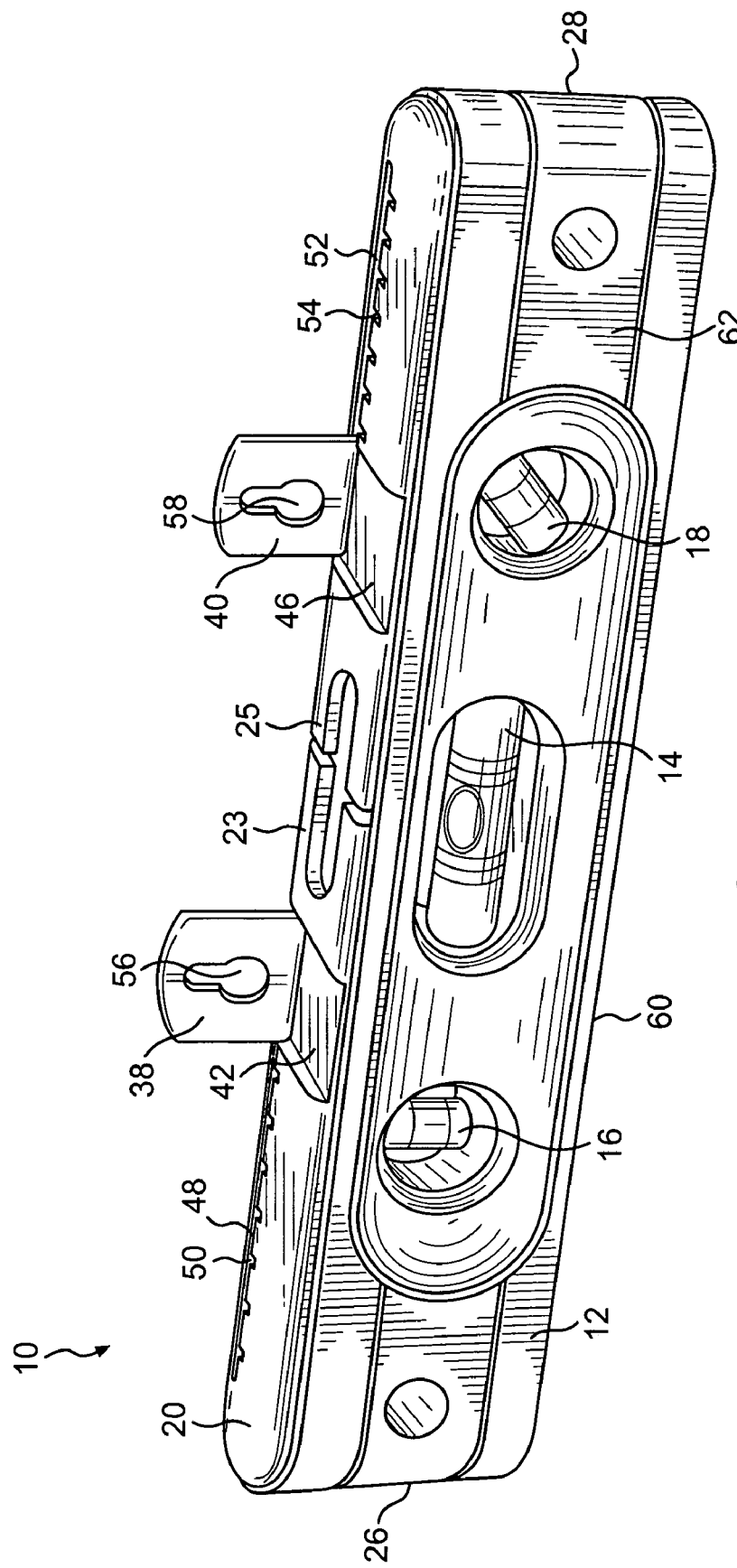
FIG. 4 is a general view of the leveling device where the fastener locators are in an extended position.

Referring to FIG. 4 the first fastener locator 38 and the second fastener locator 40 are mounted to pivot about the second axis B between a storage position and an extended position (FIG. 5). The first recess 42 in the first arm 20 defines a storage position for the first fastener locator 38 and the second recess 46 in the second arm 22 defines a storage position for the second fastener locator 40. When in the extended position, the first fastener locator 38 is slidable within the first groove 48 along the second axis B, illustrated by reference arrow E—E (FIG. 5). The first set of indentations 50 assist in locating the desired position of the first fastener locater. Likewise, the second fastener locator 38 operates relative to the second arm 22, illustrated by reference arrows F—F. The second fastener locator 40 is slidable within the second groove 52 to the desired marking positions and the second set of indentations 54 assist in locating the desired position of the second fastener locator. To obtain greater distance between the fastener locaters 38, 40 the first arm 20 and the second arm 22 are slidable along the first axis A (Arrows C—C and arrows D—D; FIG. 5).

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A level assembly comprising:
   a housing which defines a first axis;
   a level mounted within said housing;
   a first arm moveable relative to said housing along said first axis; and
   a first fastener locator movable relative to said housing with said first aim and also movable relative to said first arm, wherein said first fastener locator is moveable along a second axis parallel to said first axis.

2. The assembly of claim 1, wherein said second axis is defined by said first arm.

3. The assembly of claim 1, wherein said first fastener locator pivots about said second axis.

4. The assembly claim 3, wherein said first fastener locator pivots about said second axis between an extended and storage position.

5. The assembly of claim 4, wherein said storage position is parallel to said first arm and said extended position is perpendicular to said first arm.

6. The assembly of claim 5, wherein said first arm defines a recess to receive said fastener locator in said storage position.

7. A level assembly comprising:
   a level mounted within a housing defining a first axis;
   a first arm moveable relative to said housing along said first axis;
   a first fastener locator movable relative to said housing with said first arm, and also moveable relative to said first arm along a second axis parallel to said first axis;
   a second arm moveable relative to said housing along said first axis; and
   a second fastener locator moveable relative to said housing with said second arm and also moveable relative to said second arm along said second axis.

8. The assembly of claim 7, wherein said first arm and said second arm move independently from one another.

9. The assembly of claim 7, wherein said first fastener locator is slidably mounted to said first arm and said second fastener locator is slidably mounted to said second arm.

10. The assembly of claim 7, wherein said first fastener locator and said second fastener locator pivot about said second axis.

\* \* \* \* \*

UNITED STATES PATENT AND TRADEMARK OFFICE
CERTIFICATE OF CORRECTION

PATENT NO. : 7,210,243 B2 Page 1 of 1
APPLICATION NO. : 10/992392
DATED : May 1, 2007
INVENTOR(S) : Schmidt et al.

It is certified that error appears in the above-identified patent and that said Letters Patent is hereby corrected as shown below:

Column 1, line 16, "locations" should be --location--

Column 3, line 47, "locaters" should be --locators--

Column 4, line 13, claim 1, "aim" should be --arm--

Signed and Sealed this

Thirteenth Day of November, 2007

JON W. DUDAS
*Director of the United States Patent and Trademark Office*